(12) United States Patent
Choi et al.

(10) Patent No.: US 8,570,674 B2
(45) Date of Patent: Oct. 29, 2013

(54) OPTICAL PICKUP ACTUATOR

(75) Inventors: In Ho Choi, Sungnam-si (KR); Sam Nyol Hong, Suwon-si (KR); Jin A. Kim, Seoul (KR); Young Joong Kim, Seoul (KR)

(73) Assignee: Ionosep X Holdings L.L.C., Wilmington, DE (US)

( * ) Notice: Subject to any disclaimer, the term of this patent is extended or adjusted under 35 U.S.C. 154(b) by 0 days.

(21) Appl. No.: 13/161,800

(22) Filed: Jun. 16, 2011

(65) Prior Publication Data

US 2011/0249351 A1    Oct. 13, 2011

Related U.S. Application Data

(63) Continuation of application No. 12/750,828, filed on Mar. 31, 2010, now Pat. No. 7,986,474, which is a continuation of application No. 12/468,032, filed on May 18, 2009, now Pat. No. 7,751,133, which is a continuation of application No. 11/311,342, filed on Dec. 20, 2005, now Pat. No. 7,535,663.

(30) Foreign Application Priority Data

Dec. 21, 2004 (KR) ............ 10-2004-0109778
Dec. 21, 2004 (KR) ............ 10-2004-0109779

(51) Int. Cl.
  *G02B 7/02* (2006.01)
(52) U.S. Cl.
  USPC ............ 359/820; 359/811; 359/819
(58) Field of Classification Search
  USPC ........... 359/811, 819, 820
  See application file for complete search history.

(56) References Cited

U.S. PATENT DOCUMENTS

| | | | |
|---|---|---|---|
| 5,673,152 A * | 9/1997 | Yokota et al. | 359/813 |
| 5,781,351 A | 7/1998 | Murakami et al. | |
| 6,724,696 B2 | 4/2004 | Kim et al. | |
| 7,146,621 B2 | 12/2006 | Onozawa et al. | |
| 7,203,951 B2 | 4/2007 | Kawano et al. | |
| 7,219,359 B2 | 5/2007 | Kim et al. | |
| 2003/0179469 A1 | 9/2003 | Maeda et al. | |
| 2004/0098737 A1 | 5/2004 | Song et al. | |
| 2004/0111736 A1 | 6/2004 | Matsuda | |
| 2004/0268373 A1 | 12/2004 | Song et al. | |

FOREIGN PATENT DOCUMENTS

| | | |
|---|---|---|
| CN | 1407362 | 4/2003 |
| CN | 1527295 A | 9/2004 |
| CN | 1542773 | 11/2004 |
| EP | 1288692 | 3/2003 |

(Continued)

OTHER PUBLICATIONS

OA dated Dec. 7, 2009—for U.S. Appl. No. 12/468,032, 18 pages.

(Continued)

*Primary Examiner* — William Choi
(74) *Attorney, Agent, or Firm* — Turocy & Watson, LLP

(57) ABSTRACT

There is provided an optical pickup actuator for actuating a lens holder having an object lens according to an interaction between coils and magnets. The optical pickup actuator includes a lens-seating portion formed on the lens holder to support the object lens and a lens guide portion protruding from the lens-seating portion to securely support the object lens. The lens guide portion has an adhesive confining groove in which adhesive can be injected to securely fix the object lens.

19 Claims, 4 Drawing Sheets

(56) References Cited

FOREIGN PATENT DOCUMENTS

| | | |
|---|---|---|
| JP | 06068513 | 11/1994 |
| KR | 1999-018473 A | 3/1999 |
| KR | 10-2004-0069943 A | 8/2004 |
| KR | 10-2004-0076919 A | 9/2004 |
| KR | 10-2004-0109778 | 12/2004 |

OTHER PUBLICATIONS

Notice of Allowance dated Apr. 6, 2010 for U.S. Appl. No. 12/468,032, 10 pages.
OA dated Nov. 29, 2010 for U.S. Appl. No. 12/750,828, 13 pages.
Notice of Allowance dated Mar. 17, 2011 for U.S. Appl. No. 12/750,828, 12 pages.

\* cited by examiner

OPTICAL PICKUP ACTUATOR

CROSS REFERENCE TO RELATED APPLICATIONS

This application is a continuation of U.S. patent application Ser. No. 12/750,828, filed Mar. 31, 2010, entitled "OPTICAL PICKUP ACTUATOR", which is a continuation of U.S. patent application Ser. No. 12/468,032, filed May 18, 2009, entitled "OPTICAL PICKUP ACTUATOR", which is a Continuation of U.S. patent application Ser. No. 11/311,342, filed on Dec. 20, 2005, entitled "OPTICAL PICKUP ACTUATOR", the entireties of which are incorporated herein by reference.

BACKGROUND OF THE INVENTION

1. Field of the Invention

The present invention relates to an optical pickup actuator for reading and writing data from and to an optical recording medium.

2. Description of the Related Art

The optical pickup actuator maintains a relative location between an object lens and an optical recording medium at a predetermined distance by moving a moving part on which the object lens is mounted and reads and writes information from and to the optical recording medium by following a track of the optical recording medium.

The optical pickup actuator has a permanent magnet and a coil. When the electric current is applied to the coil, the optical pickup actuator moves the object lens to a desired location. At this point, the moving part moves in focusing and tracking directions that are perpendicular to each other.

FIGS. 1A and 1B are schematic views of an optical pickup actuator according to the related art.

Referring to FIGS. 1A and 1B, an optical pickup actuator includes a lens holder 102 for mounting an object lens on a central portion thereof and having an outer circumference around which tracking and focusing coils 106 and 105 are wound, magnets and yokes 103 and 104 installed on the base and opposing the tracking and focusing coils 106 and 105 of the lens holder 102, a plurality of wire suspensions 107 each having a first end fixed on a side surface of the lens holder to support the lens holder 102, and a damper holder 109 to which a second end of each wire suspensions 107 is fixed.

Reference numeral 109 denotes fixing plates fixed on the lens holder 102 and the first ends of the wire suspensions 107 are fixed on the fixing plates 109 through a soldering process.

The optical pickup actuator will be now described in more detail.

The object lens 101 is mounted on the central portion of the lens holder 102. The focusing coil 105 for focusing is wound around each corner of the lens holder. The tracking coil for tracking is wound around a center portion of left and right surfaces of the lens holder 102.

The yokes 104 are formed of a ferromagnetism material protrude. The yokes face the focusing and tracking coils 105 and 106. The magnets are fixed on front surfaces of the respective yokes 104. The yokes 104 are fixed on a pickup base (not shown).

The fixing plates 108 are couple to the lens holder 102. The first ends of a pair of wire suspensions 107 parallel to each other are fixed to each fixing plate 108 through the soldering process. The second ends of the wire suspensions are fixedly inserted in a damper of the damper holder 109.

The damper is coupled inside the damper holder 109 so that the wire suspensions each having a rigidity can has a damping property. A main board (not shown) is coupled to an outer surface of the damper holder 109. The second ends of the wire suspensions 107 are actually fixed on the main board.

The lens holder 102 is lifted by the wire suspensions 107 and electric current is applied to the wire suspensions 107.

When electric current is applied to the tracking coil 106, repulsive and attractive forces are generated by an electromagnetic force between the focusing coil 105 and the magnets 103. By the repulsive and attractive forces, the lens holder 102 moves in the focusing direction (in a vertical direction), thereby operating a focusing servo for compensating for a focusing error.

The above-described optical pickup actuator is a moving coil type where the focusing and tracking coils 105 and 106 move together with the lens holder 102 around which the focusing and tracking coils 105 and 16 are wound.

There is also a moving magnet type where the magnets are attached on the outer circumference of the lens holder so as to move together with the lens holder. At this point, the movement using the magnets and the coils uses Lorentz's force of Fleming's left-hand rule.

The above-described optical pickup actuator reads and writes information on an optical recording medium. In recent years, as multimedia systems have been rapidly developed and capacities of multimedia contents such as games and movies has been increased, it has been required that the optical pickup actuator must be reliable to stably drive the multimedia systems for many hours.

When the multimedia system is driven for many hours, heat is generated by the electric current applied to the coils of the optical pickup actuator and transmitted to the object lens through the lens holder.

When the heat generated by the coils is transmitted to the object lens for a long time, the aberration is increased. Furthermore, when excessive electric current is applied to the coils, the object lens may be cracked due to a thermal-stress. Therefore, there is a need for an optical pickup actuator that can improve a driving reliability by reducing the heat transmitted from the coils to the object lens.

Also, in a high speed optical pickup actuator, even when the object lens is attached to the lens holder using adhesive, the lens holder may be different in a frequency response from the object lens since the adhesive force is not enough. That is, a resonance peak of the lens holder may be greater than a resonance peak of the object lens.

Therefore, there is also a need for an optical pickup actuator that can improve the driving reliability by attenuating the resonance characteristics.

SUMMARY OF THE INVENTION

Accordingly, the present invention is directed to an optical lens actuator that substantially obviates one or more problems due to limitations and disadvantages of the related art.

An object of the present invention is to provide an optical pickup actuator that can minimize the transmission of heat from coils to an object lens by forming recessed portions on side surfaces of a lens holder.

Another object of the present invention is to provide an optical pickup actuator that can block out heat that is transmitted from coils to an object lens by processing heat discharge grooves on a lens-seating portion surrounding a beam-passing hole.

Still another object of the present invention is to provide an optical pickup actuator that can enhance a bonding force of an object lens by improving a bonding structure between a lens holder and the object lens.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical pickup actuator for actuating a lens holder having an object lens according to an interaction between coils and magnets, the optical pickup actuator including: a lens-seating portion formed on the lens holder to support the object lens; and a lens guide portion protruding from the lens-seating portion to securely support the object lens, wherein the lens guide portion has an adhesive confining groove in which adhesive can be injected to securely fix the object lens.

In another aspect of the present invention, there is provided an optical pickup actuator for actuating a lens holder having an object lens according to an interaction between coils and magnets, the optical pickup actuator, wherein the lens holder is provided at a side surface with a dissipation groove that does not directly contact a tracking coil.

In still another aspect of the present invention, there is provided an optical pickup actuator comprising: a lens holder having a lens-seating portion on which an object lens seats and a bobbin around which a focusing coil is wound, and a coil-supporting portion around which a tracking coil is wound, wherein the coil-supporting portion protrudes from a side surface of the lens holder and the side surface of the lens holder is provided with a coil-contacting portion contacting the tracking coil and a heat dissipation groove that does not contact the tracking coil.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
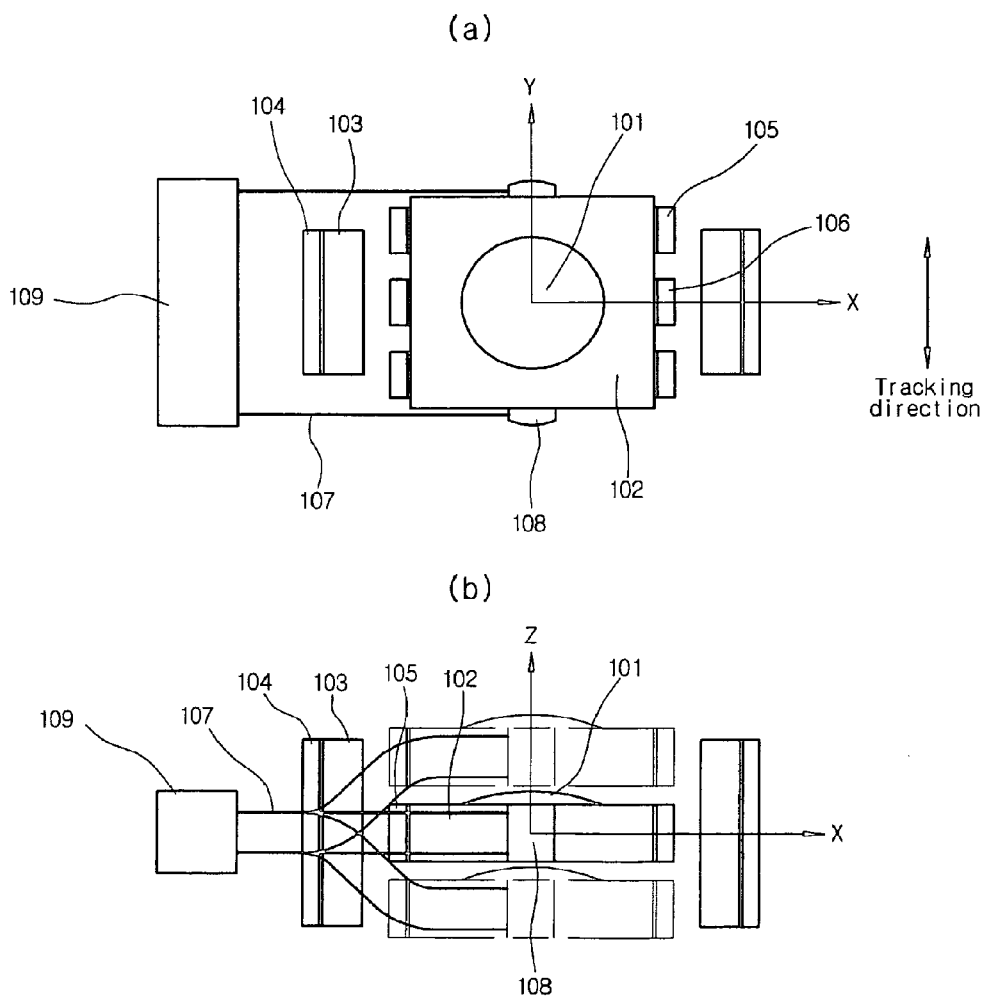
FIGS. 1A and 1B are schematic views of an optical pickup actuator according to the related art.
Figure 2:
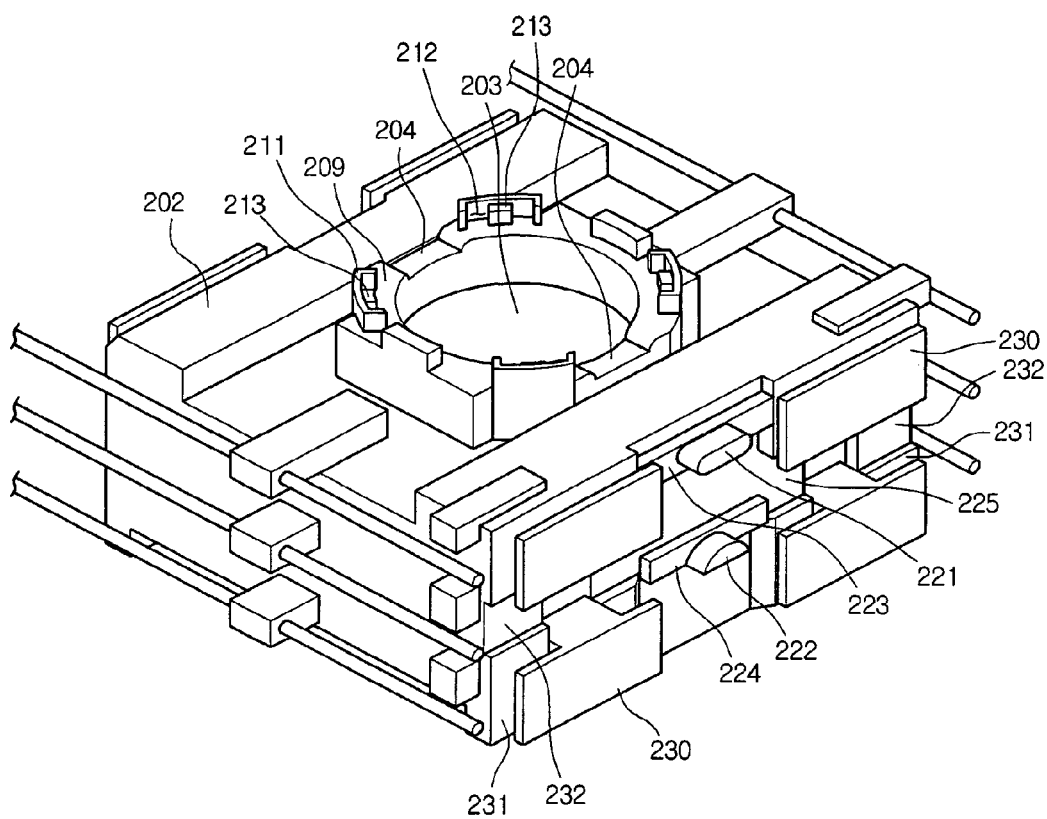
FIGS. 2 through 4 are views illustrating an optical pickup actuator according to an embodiment of the present invention.
Figure 3:
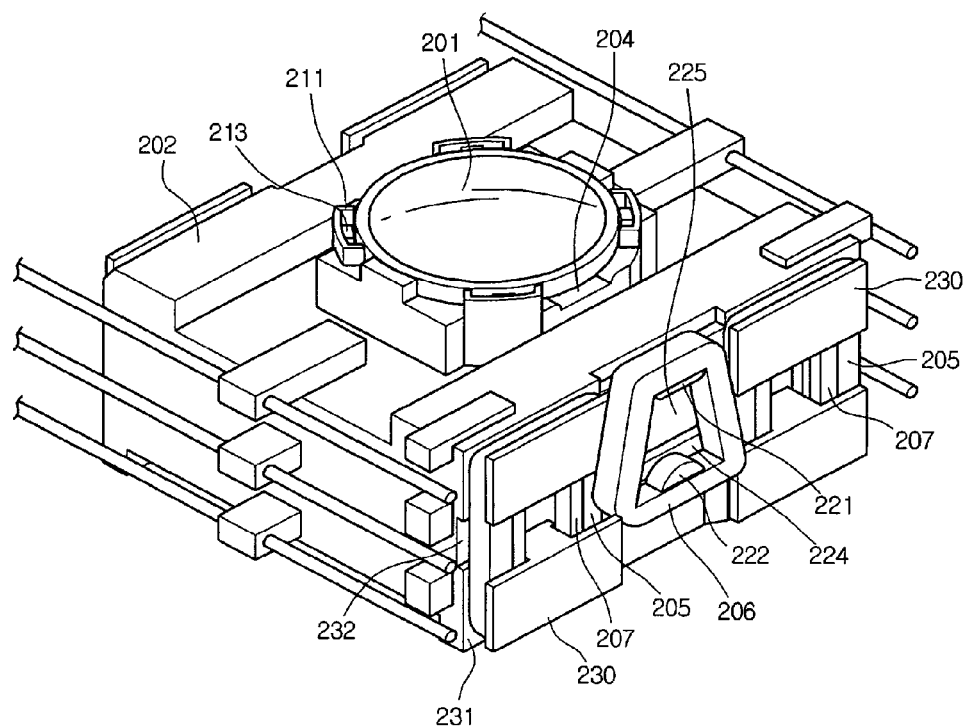
Figure 4:
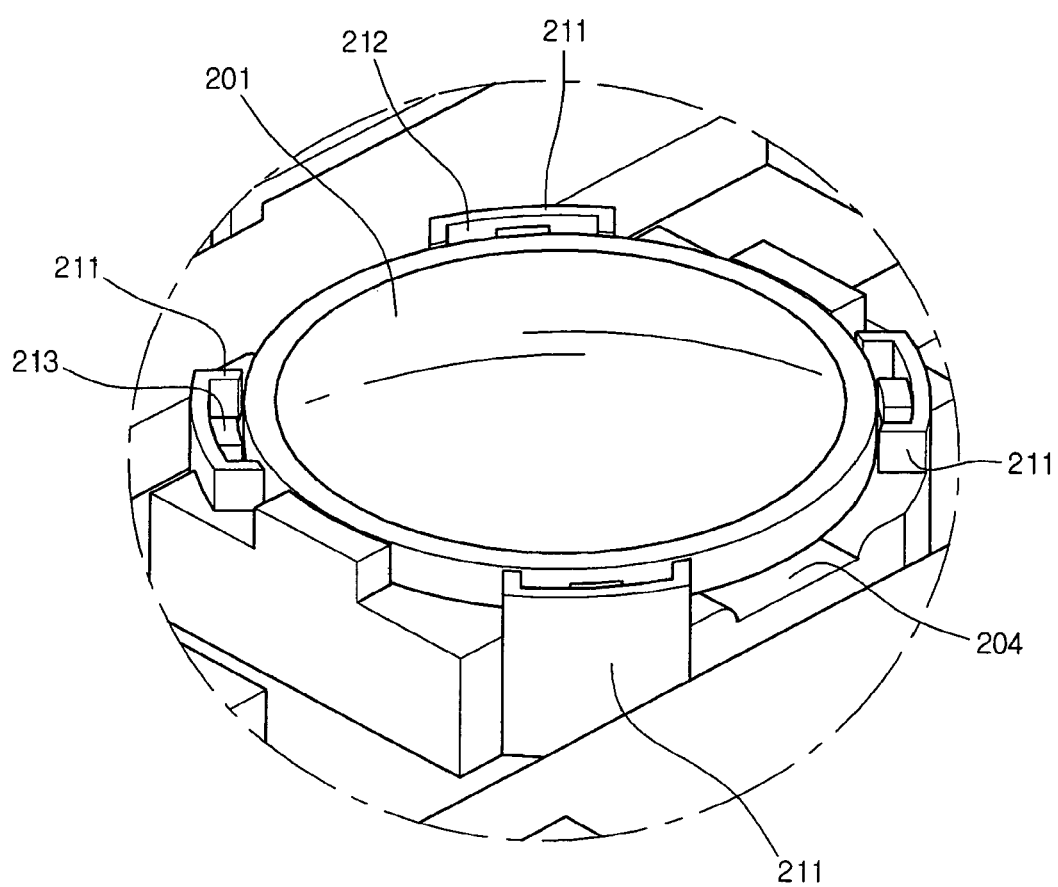

FIGS. 2 through 4 are views illustrating an optical pickup actuator according to an embodiment of the present invention.

Referring to FIGS. 2 through 4, a lens holder 202 has first heat dissipation grooves 204 formed on a lens-seating portion 209 on which an object lens 201 seats, second heat dissipation grooves 225 formed on centers of opposite side surfaces of the lens holder 202, and third heat dissipation grooves 232 formed on left and right portions of each of the opposite side surfaces of the lens holder 202.

The object lens 201 seating on the lens-seating portion 209 is aligned with a beam-passing hole 203 surrounded by the lens-seating portion 209. Lens guide portions 211 protrude from the lens-seating portion 209 to fixedly support the object lens 201. The lens guide portions 211 are formed along a circumference having an inner diameter greater than an outer diameter of the object lens 201.

The lens guide portions 211 are opened upward and toward a location where the object lens is located. For example, the lens guide portions 211 may be disposed about 90° apart. Each of the lens guide portion 211 has an adhesive confining groove 212 and an adhesive reinforcing projection 213 for dividing the adhesive confining groove 212 into two sections. The adhesive reinforcing projection 213 extends toward the object lens.

One or more reinforcing projections 213 may be formed on each lens guide portion 211, having a height lower than that of the lens guide portion 211.

Referring to FIG. 4, the adhesive is injected into the lens guide portion 211 after the object lens 201 seats on the lens-seating portion 209. The adhesive may be a UV adhesive or a bond. The injected adhesive does not leak out of the lens guide portion 211 due to the internal structure of the lens guide portion 211. At this point, since the adhesive reinforcing projection 213 is formed in the adhesive confining groove 212, the adhesive force of the adhesive can be more enhanced.

As the adhesive is applied between he lens guide portions 211 and the object lens 201, the adhesive force for bonding the object lens 201 to the lens holder 202 is further enhanced.

Accordingly, when the lens holder 202 is driven at a high speed, the resonance peak of the object lens 201 becomes identical to that of the lens holder 202.

Meanwhile, the first heat dissipation grooves 204 are respectively formed on opposite portion of the lens-seating portion 209 that are adjacent to the coils. By the first heat dissipation grooves 204, portions of the object lens 201 do not contact the lens-seating portion 209.

Therefore, an amount of the heat transmitted to the object lens 201 through the lens-seating portion 209 can be reduced.

Also, second heat dissipation means is formed on the centers of the opposite surfaces of the lens holder 200. The second heat dissipation means includes second coil contacting portions 223 and 224 on which portions where coil-supporting portions 221 and 222 will be formed are elevated so that upper and lower portions of the tracking coils 206 contact the coil supporting portions 221. The second heat dissipation means further includes the second dissipation grooves 225 formed portions where a middle portion of an inner surface of the tracking coil 206 will contact. By the second dissipation grooves 225, portions of the tracking coil 206 do not contact the lens holder 202.

Here, each of the second heat dissipation grooves 225 may be unevenly formed and has a width wider than those of the second coil contacting portions 223 and 224.

Also, third heat dissipation means is formed by stepping left and right sides of opposite surface of the lens holder 202, which corresponds to inner surfaces of bobbins 230 around which the focusing coil 205 is wound. The third heat dissipation means includes third contacting portions 231 to which upper and lower portions of the focusing coil 205 contact. The third contacting portions 231 are elevated from the opposing surfaces of the lens holder 202. The third heat dissipation means further includes third heat dissipation grooves 232 formed on the opposite surface of the lens holder 202. The third heat dissipation grooves 232 correspond to the middle portion of the focusing coil 205. Therefore, the middle portion of the focusing coil does not directly contact the lens holder 202 by the third dissipation grooves 232.

Each of the third heat dissipation grooves 225 may be unevenly formed and has a width defined between the upper and lower bobbins 230. Preferably, the width of the third heat dissipation grooves 225 is wider than those of the third coil contacting portions 231.

The case where the coils are wound around the lens holder 202 having the above described first and second heat dissipation means is illustrated in FIG. 3.

The coils may be formed in a variety of shapes such as a rectangular shape or a trapezoid shape.

Referring to FIG. 3, the tracking coils 206 are wound around middle portions of the opposite surfaces of the lens holder 202 and the focusing and radial coils 205 and 207 are wound around left and right sides of the opposite surfaces of the lens holder 202. The tracking coils 206 are supported by the coil supporting portions 221 and 222 and the middle portion of the inner surfaces of the tracking coils 206 are spaced away from the opposite surfaces of the lens holder 202 by the second heat dissipation grooves 225. That is, since the upper and lower portions of the inner surfaces of the tracking coils 206 contact the second coil contacting portions 223 and 224, the middle portions of the inner surfaces of the tracking coils 206 do not directly contact the lens holder 202 by the second dissipation grooves 225. Accordingly, an amount of the heat generated by the tracking coils 206 and transmitted to the object lens can be reduced.

Furthermore, the focusing and radial coils 205 and 207 are dually wound. Middle portions of the inner surfaces of the focusing and radial coils 205 and 207 do not directly contact the tracking coil 206 by the third heat dissipation grooves 232 stepped inward from the third coil contacting portions 131. Therefore, an amount of heat generated from the focusing and radial coils 205 and 207 and transmitted to the object lens can be reduced.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A method, comprising:
coupling an adhesive reinforcing projection to at least one lens guide portion having an adhesive confining groove, wherein the adhesive reinforcing projection divides the adhesive confining groove into at least two sections; and
disposing the least one lens guide portion along a circumference of a lens seating portion having at least one heat dissipation groove.

2. The method of claim 1, further comprising disposing an object lens on the lens seating portion wherein the object lens is separated from the heat dissipation groove.

3. The method of claim 2, further comprising orienting the adhesive reinforcing projection to extend in a direction toward the object lens.

4. The method of claim 2, further comprising injecting adhesive into the adhesive confining groove to fix the object lens.

5. The method of claim 4, wherein the injecting comprises injecting the adhesive in a space between an inner surface of the at least one lens guide portion and the object lens.

6. The method of claim 4, further comprising forming the adhesive reinforcing projection to divide the adhesive.

7. The method of claim 4, further comprising fabricating the adhesive reinforcing projection to have a height that is less than a height of the at least one lens guide portion.

8. The method of claim 1, wherein the disposing comprises disposing the at least one lens guide portion to open upward with respect to the lens seating portion.

9. A method, comprising:
disposing an object lens on a lens seating portion having a first heat dissipation groove, wherein the first heat dissipation groove does not contact the object lens;
coupling the lens seating portion to a lens holder; and
disposing a lens guide portion, comprising an adhesive confining groove, along a circumference of the lens seating portion.

10. The method of claim 9, further comprising:
coupling a bobbin to the lens holder; and
winding a focusing coil around the bobbin.

11. The method of claim 10, further comprising:
fabricating a side surface of the lens holder to include a coil contacting portion that contacts the focusing coil and a second heat dissipation groove that does not contact the focusing coil.

12. The method of claim 10, further comprising winding a radial coil around the bobbin.

13. The method of claim 9, further comprising:
coupling a coil supporting portion to a side surface of the lens holder; and
winding a tracking coil around the coil supporting portion.

14. The method of claim 11, further comprising:
fabricating a side surface of the lens holder to include a coil contacting portion that contacts the tracking coil and a second heat dissipation groove that does not contact the tracking coil.

15. The method of claim 9, further comprising coupling an adhesive reinforcing projection to the lens guide portion, wherein the adhesive reinforcing projection divides the adhesive confining groove into two or more sections.

16. The method of claim 9, wherein the disposing the lens guide portion comprises disposing the lens guide portion to open toward the object lens.

17. A method, comprising:
connecting a lens seating portion, having a heat dissipation groove, to a lens holder;
disposing a plurality of lens guide portions, having respective adhesive confining grooves, along a circumference of the lens seating portion; and
disposing an object lens on the lens seating portion, wherein the object lens is separated from the heat dissipation groove.

18. The method of claim 17, further comprising fabricating at least one of the plurality of lens guide portions to include one or more adhesive reinforcing projections that divide at least one of the plurality of lens guide portions into a plurality of sections.

19. The method of claim 18, further comprising injecting adhesive into the respective adhesive confining grooves to fix the object lens.

* * * * *

UNITED STATES PATENT AND TRADEMARK OFFICE
CERTIFICATE OF CORRECTION

PATENT NO.         : 8,570,674 B2
APPLICATION NO.    : 13/161800
DATED              : October 29, 2013
INVENTOR(S)        : Choi et al.

Page 1 of 1

It is certified that error appears in the above-identified patent and that said Letters Patent is hereby corrected as shown below:

In the Specification

In Column 1, Line 46, delete "Reference numeral 109" and insert -- Reference numeral 108 --, therefor.

In Column 1, Line 48, delete "fixing plates 109" and insert -- fixing plates 108 --, therefor.

In Column 4, Line 31, delete "between he lens" and insert -- between the lens --, therefor.

Signed and Sealed this
First Day of April, 2014

Michelle K. Lee
*Deputy Director of the United States Patent and Trademark Office*